(12) United States Patent
Bradai et al.

(10) Patent No.: US 10,916,133 B2
(45) Date of Patent: Feb. 9, 2021

(54) DETERMINATION OF AN OPTIMUM SPEED FOR A MOTOR VEHICLE APPROACHING A TRAFFIC LIGHT

(71) Applicant: VALEO Schalter und Sensoren GmbH, Bietigheim-Bissingen (DE)

(72) Inventors: Benazouz Bradai, Créteil (FR); Alexandre Garnault, Créteil (FR)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 196 days.

(21) Appl. No.: 15/515,202

(22) PCT Filed: Oct. 8, 2015

(86) PCT No.: PCT/EP2015/073301
§ 371 (c)(1),
(2) Date: Mar. 29, 2017

(87) PCT Pub. No.: WO2016/055589
PCT Pub. Date: Apr. 14, 2016

(65) Prior Publication Data
US 2017/0229014 A1   Aug. 10, 2017

(30) Foreign Application Priority Data

Oct. 8, 2014   (FR) ..................... 14 02270

(51) Int. Cl.
*G08G 1/0967*   (2006.01)
*B60W 30/16*   (2020.01)
(Continued)

(52) U.S. Cl.
CPC ..... *G08G 1/096725* (2013.01); *B60W 30/162* (2013.01); *G08G 1/0967* (2013.01);
(Continued)

(58) Field of Classification Search
CPC .......... G08G 1/096725; G08G 1/0967; G08G 1/096783; G08G 1/096716;
(Continued)

(56) References Cited

U.S. PATENT DOCUMENTS

2003/0078718 A1* 4/2003 Takenaga ........... B60K 31/0008
701/96
2005/0134478 A1* 6/2005 Mese ............... G08G 1/096716
340/901
(Continued)

FOREIGN PATENT DOCUMENTS

| FR | 2 921 183 A1 | 3/2009 | |
| FR | 2 979 458 A1 | 3/2013 | |
| GB | 2452835 A | * 3/2009 | ....... G08G 1/096716 |

OTHER PUBLICATIONS

Machine Translation of FR 2979458 A (Year: 2013).*
(Continued)

*Primary Examiner* — Yuri Kan
*Assistant Examiner* — Majdi Alsomiri
(74) *Attorney, Agent, or Firm* — Osha Bergman Watanabe & Burton LLP

(57) ABSTRACT

The invention relates to a method for determining an optimum speed ($V_{OPT}$) to be adopted by a motor vehicle (1) when said motor vehicle (1) is approaching a traffic light (2). According to said method a first GLOSA-type on-board system (10) determines, upon receiving a message emitted by said traffic light (2), a total distance ($D_{TL}$) of travel separating the motor vehicle (1) from the traffic light (2), then estimates the time necessary for the motor vehicle (1) to travel said total distance ($D_{TL}$), and finally defines a recommended speed ($V_Q$) based on the status of the traffic light (2) at the end of the estimated time. The method is characterised in that it also uses at least one speed limitation produced via a second system (12; 13) on board said motor (Continued)

vehicle such as to determine said recommended speed ($V_Q$) and/or said optimum speed ($V_{OPT}$).

8 Claims, 2 Drawing Sheets

(51) Int. Cl.
 *B60W 30/14* (2006.01)
 *G01C 21/34* (2006.01)
 *G08G 1/095* (2006.01)

(52) U.S. Cl.
 CPC . *G08G 1/096708* (2013.01); *G08G 1/096716* (2013.01); *G08G 1/096758* (2013.01); *G08G 1/096783* (2013.01); *B60W 30/143* (2013.01); *G08G 1/095* (2013.01)

(58) Field of Classification Search
 CPC ....... G08G 1/096708; G08G 1/096758; G08G 1/095; B60W 30/162; B60W 30/143; B60W 30/14; G01C 21/34
 See application file for complete search history.

(56) References Cited

U.S. PATENT DOCUMENTS

| | | | |
|---|---|---|---|
| 2005/0140523 A1* | 6/2005 | Publicover | G08G 1/095 340/907 |
| 2008/0071460 A1* | 3/2008 | Lu | B60T 7/18 701/93 |
| 2015/0066350 A1* | 3/2015 | Iwata | G01C 21/3697 701/400 |
| 2017/0274899 A1* | 9/2017 | Limbacher | B60W 50/14 |

OTHER PUBLICATIONS

International Search Report issued in PCT/EP2015/073301 dated Apr. 4, 2016 (2 pages).
Written Opinion of the International Searching Authority issued in PCT/EP2015/073301 dated Apr. 4, 2016 (5 pages).

* cited by examiner

DETERMINATION OF AN OPTIMUM SPEED FOR A MOTOR VEHICLE APPROACHING A TRAFFIC LIGHT

BACKGROUND

The present invention generally relates to the field of motor vehicles, and more specifically a method and an on-board system for determining the optimum speed to be adopted by a motor vehicle when the latter approaches a traffic light.

It relates more particularly hereafter to the road cooperative systems, also called Cooperative Intelligent Transport Systems (or C-ITS), which are based on a local and direct communication between the elements of the system (vehicles and road infrastructure units).

Thus, some on-board systems developed by various car manufacturers are proving to be increasingly comprehensive and able to communicate with the other vehicles on the road but also with the public infrastructures, such as the traffic lights. These systems, known as "Vehicle-to-X" or "Car-to-X" (the letter X representing either another vehicle, or a public infrastructure), use a wireless communication network (for example cellular, W-LAN or VANET) to exchange information with the road infrastructures (lights, grade crossings, works, etc.) and communicate continuously and in real time via this wireless network such as to allow the driver to be warned of the dangers before even seeing them, or to allow a genuine automatic control with strategies for deceleration, acceleration, stopping and restarting no longer requiring the intervention of the driver.

SUMMARY

As illustrated schematically in FIG. 1, a cooperative system for uses relating to the exchanges of information between a motor vehicle 1 and a traffic light 2, mainly includes:
- an electronic unit (not shown) fixed on the traffic light 2, suitable in particular for generating and transmitting periodically messages via a wireless link; and
- an on-board module on board the motor vehicle including, in particular, a receiver 10 suitable for receiving the messages, and a processing module (not shown) for extracting and processing the data of the received messages depending on the intended use.

The messages transmitted by the traffic light, also called SPAT (Signal Phase And Timing) messages mainly include location information relating to the position of the light, state information relating to the phase (red, orange or green) of the light, and time information relating to the instants at which the phase changes are provided.

A first possible use relates to the autonomous motor vehicles provided with a "Start and Go" functionality with the aim of reducing the consumption of the vehicle stopped at the traffic lights. The broadcasting, to a vehicle, of the light state information and of the durations remaining for the phases allows it to optimize these strategies for stopping and restarting. For example, if the vehicle approaches a red light, the latter forwards to the vehicle the information concerning the minimum duration at which the light will still remain red. From this information, it is possible for the vehicle on-board computer to determine if stopping the engine will reduce or not the overall consumption of the vehicle taking into account the restart phase that follows. Likewise, the transmitted information will be used to optimize the instant for restart which will be triggered a few seconds before the change to green.

Another possible use, in which the present invention more particularly fits, relates to the systems called GLOSA (Green Light Optimized Speed Advisory) or "green wave", allowing the motor vehicle to determine the optimum speed that it must adopt when approaching a light to pass the light at green, without stopping. In this use, the traffic lights of a highway are preferably networked to enable them to be synchronized. The users are informed about the speed to be adopted in order to pass all of the following lights at green.

FIG. 2 schematically illustrates the various steps generally implemented by the processing module on board on the vehicle 1 as part of a GLOSA algorithm 110, and as are described in particular in the document "Performance study of a Green Light Optimized Speed Advisory (GLOSA) Application Using an Integrative Cooperative ITS Simulation Platform" (Katsaros et al, 2011 IEEE-978-1-4577-9538-2/11):

The processing starts with the receipt of a SPAT message (step 100) by the on-board receiver 10, for extracting the information contained in the message. Using the location information transmitted by the light, and with knowledge of the position of the vehicle, the processing module can calculate the total distance $D_{TL}$ of the route separating the motor vehicle 1 and the traffic light 2 (step 111). Also with knowledge of the usual speed $U_0$ of the vehicle 1 and the usual acceleration $a_0$ thereof, the processing module then makes an estimate of the time $T_{TL}$ required for the motor vehicle 1 to cover this total distance $D_{TL}$ (Step 112). This estimate is generally carried out by using the following system of equations:

$$T_{TL} = \frac{D_{TL}}{U_0} \text{ if } a_0 = 0$$

$$T_{TL} = -\frac{U_0}{a_0} + \sqrt{\frac{U_0^2}{a_0} + \frac{2D_{TL}}{a_0}} \text{ if } a_0 \neq 0$$

At the end of the processing, the processing module can provide a recommended speed $V_G$ as a function of the state held by the traffic light 2 at the end of the estimated time $T_{TL}$ (step 119), and taking into account preferably information $U_{min}$, $U_{max}$ corresponding to respectively minimum and maximum speed limits for the road taken, when they are known.

For example, if the traffic light 2 is supposed to be in the green state at the end of the time $T_{TL}$, the vehicle can continue to travel while reaching, if possible, the maximum speed limit $U_{max}$ (steps 113 and 114). If the traffic light 2 is supposed to be in the red state at the end of the time $T_{TL}$, the system will estimate a speed Ut according to the relation:

$$U_t = \frac{2 \times D_{TL}}{T_{TL} + T_R} - U_0$$

in which $T_R$ corresponds to the additional duration required for the light to turn green (steps 115 and 116).

Finally, if the traffic light 2 is supposed to be in the orange state at the end of the time $T_{TL}$, the system will estimate a speed Ut according to the relation:

$$U_t = \frac{2 \times D_{TL}}{T_{TL} + T_R + T_O} - U_0$$

in which $T_R+T_O$ corresponds to the additional duration required for the light to turn green (steps 117 and 118).

A disadvantage of the GLOSA algorithm is that it does not take sufficient account of the environment of the vehicle 1. In particular, even if the system has the values $U_{min}$ and $U_{max}$, it does not take into account the fact that several speed limits may occur in the route separating the motor vehicle and the traffic light. Furthermore, it does not consider other important environmental data such as the presence of another vehicle on the route. As a result, the speed $V_G$ recommended by the GLOSA system is not in fact always suitable for the situation encountered.

The aim of the present invention is to propose a solution which improves the accuracy of the optimum speed finally delivered to the motor vehicle from a GLOSA system.

For this purpose, the invention proposes using available information also coming from other systems on board the vehicle.

More specifically, the first object of the present invention is a method for determining an optimum speed to be adopted by a motor vehicle when said motor vehicle approaches a traffic light, said optimum speed being a function of a recommended speed estimated by a first on-board system, on receipt of a message sent by said traffic light using a determination of a total distance of the route separating the motor vehicle and the traffic light, an estimate of the time required for the motor vehicle to cover said total distance and a determination of a recommended speed as a function of the state held by the traffic light at the end of the estimated time, the method being characterized in that said recommended speed and/or said optimum speed is also a function of at least one speed limit obtained via a second system on board said motor vehicle.

In one possible implementation of the method, said total distance of the route can be broken down into a succession of road sections, and said recommended speed is a function of a plurality of speed limits obtained via the second on-board system, each speed limit corresponding to a regulatory maximum speed value allowed on each section of said succession of road sections.

The time required for the motor vehicle to cover said total distance is, for example, estimated by the first on-board system according to the relation:

$$\sum_i \frac{L_i}{\text{MIN}(SL_i; U_0)}$$

wherein $L_i$ corresponds to a length of each section i associated with a regulatory maximum speed value $SL_i$, and U0 is the usual speed of the motor vehicle.

The length of each section and the regulatory maximum speed value associated with each section are preferably delivered by a navigation system forming said second system and including a receiver on board the motor vehicle.

In another possible implementation, the second on-board system is a speed control system suitable for detecting the presence and for estimating the speed of another vehicle in front of said motor vehicle, and said at least one speed limit corresponds to the estimated speed of the other vehicle.

Said optimum speed can be determined by taking the minimum value between said estimated speed of the other vehicle and the recommended speed.

Another object of the invention is a system for determining an optimum speed to be adopted by a motor vehicle when said motor vehicle approaches a traffic light, said optimum speed being a function of a recommended speed estimated by a first on-board system, on receipt of a message sent by said traffic light using a determination of a total distance of the route separating the motor vehicle and the traffic light, an estimate of the time required for the motor vehicle to cover said total distance and a determination of a recommended speed as a function of the state held by the traffic light at the end of the estimated time, the system being characterized in that it determines said recommended speed and/or said optimum speed also as a function of at least one speed limit obtained via a second system on board said motor vehicle.

In a first possible embodiment, the second on-board system is a navigation system that can deliver the length of each section of a succession of road sections breaking down said total distance of the route, and a regulatory maximum speed value associated with each section. The first system can then estimate the time required for the motor vehicle to cover said total distance as a function of the length and of the regulatory speed which are associated with each section.

In a second possible embodiment, the second on-board system is a speed control system that can detect the presence and estimate the speed of another vehicle in front of said motor vehicle, and it determines said optimum speed as a function of said speed recommended by the first system and of the estimated speed of the other vehicle.

It should be noted that the two embodiments are not exclusive, and can very well be combined into a system that would use both the data provided by a navigation system to optimize the value of the speed recommended by the GLOSA system, using a better estimate of the route time, and the data provided by a speed control system to take into account a constraint linked to the presence of another vehicle.

BRIEF DESCRIPTION OF THE DRAWINGS

The invention will be better understood from the following description, with reference to the appended figures, in which.

DETAILED DESCRIPTION

Hereafter, the elements common to the various figures have the same references.

The invention therefore starts from the acknowledgement that most vehicles are today provided with other driver assistance systems, such as a GPS navigation system, and/or a speed control system.

Figure 1:
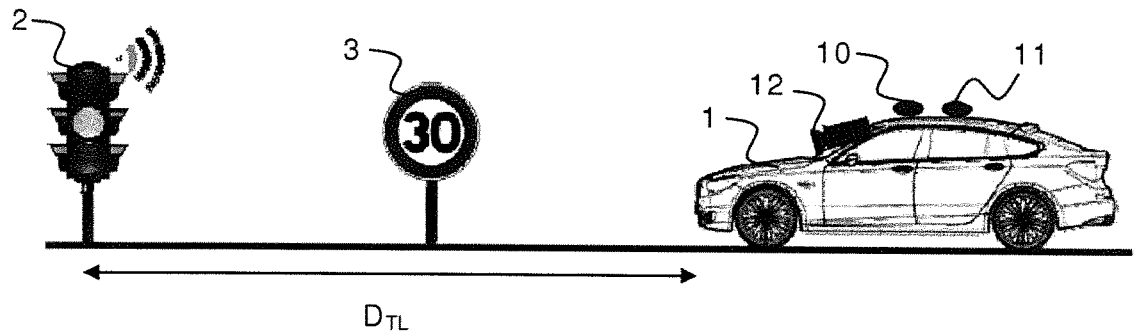
FIG. 1 schematically illustrates a motor vehicle provided with a system according to the invention, approaching a traffic light.
Figure 2:
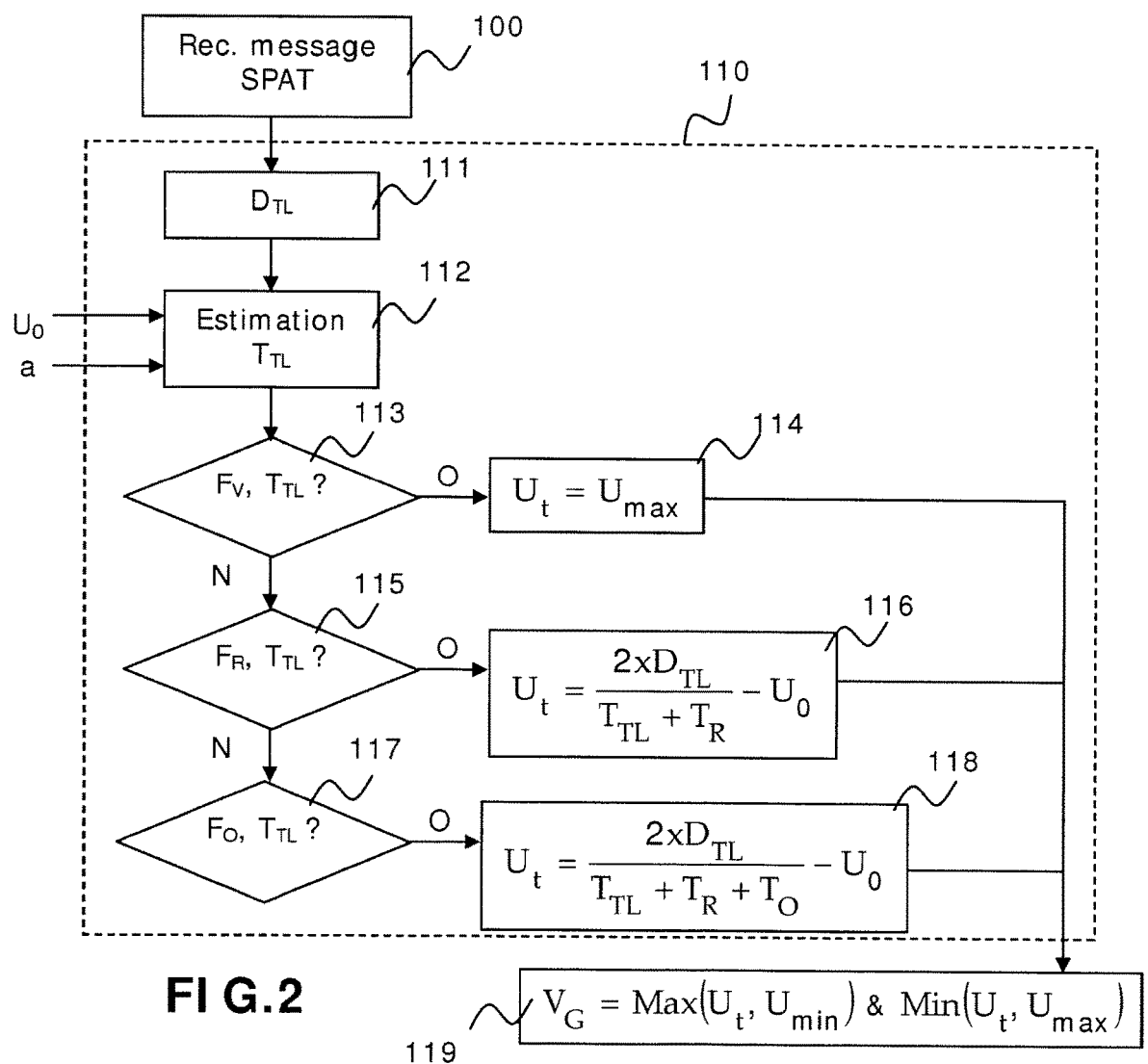
FIG. 2 shows a simplified block diagram of a known GLOSA algorithm.

Thus, referring to FIG. 1, the motor vehicle 1 generally also has:

for navigation assistance, a receiver 11, for example a GPS satellite signal receiver; and/or for speed control, a sensor 12 such as a camera or a radar, for monitoring the space located in front of the vehicle 1, and calculating the distance, the direction and the speed of other vehicles in front thereof.

Figure 3A:
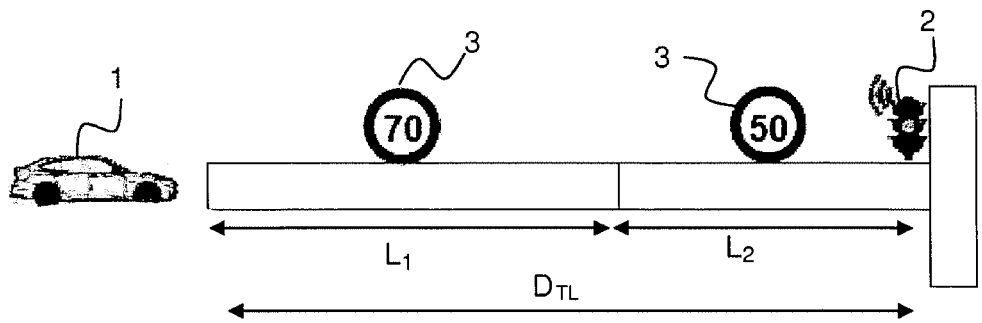
FIGS. 3a and 3b explain an example of implementing the method using the data provided by a navigation system.

The presence of one and/or of the two additional systems on board the motor vehicle will be able to be utilized to refine the recommended speed $V_G$ given by the GLOSA system 10, as will be described using the various following non-limiting situations:

FIG. 3a particularly illustrates the case where several speed limits, represented in this case by two traffic signs 3 (one at 70 km/hour, the other at 50 km/hour), are present on the route of distance $D_{TL}$ between the motor vehicle 1 and the traffic light 2.

In other words, the route of total distance $D_{TL}$ can be broken down into a succession of road sections, in the present example two sections of respective length $L_1$ and $L_2$, each section being associated with a regulatory maximum speed value allowed for the section, namely 70 km/hour for the section of length $L_1$, and 50 km/hour for the section of length $L_2$. Yet, this data can be extracted from the navigation system since the latter can anticipate the route that the motor vehicle will follow, and generally has, in the map database thereof, information on length of sections and associated regulatory speed limits.

Figure 3B:
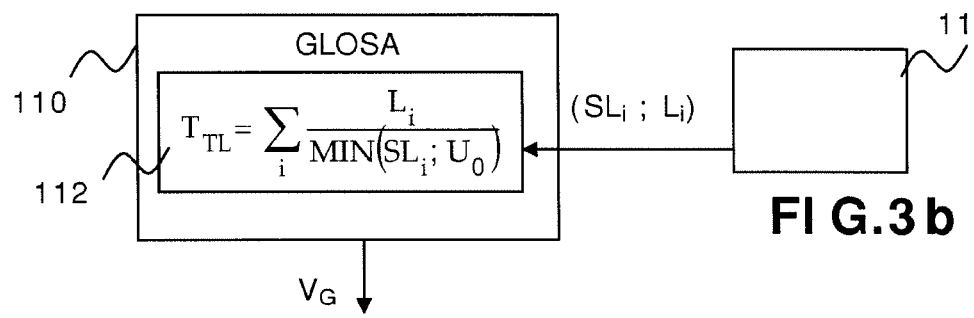

Rather than only taking account of the usual speed $U_0$ of the motor vehicle 1 for estimating the route time $T_{TL}$ (step 112 in FIG. 1), the present invention proposes, as illustrated in FIG. 3b, changing this step 112 such that it takes into account all of the section length/associated regulatory speed limit pairs provided by the navigation system 11.

The time $T_{TL}$ required for the motor vehicle 1 to cover the total distance $D_{TL}$ is estimated by the first on-board system 10 by applying preferably the according to the relation:

$$T_{TL} = \sum_i \frac{L_i}{\mathrm{MIN}(SL_i; U_0)}$$

wherein $L_i$ corresponds to a length of each section i associated with a regulatory maximum speed value $SL_i$, and $U_0$ is the usual speed of the motor vehicle.

In an alternative embodiment, the pairs ($SL_i$, $L_i$) can be provided by a system other than a navigation system, for example a system for imaging using images captured by an on-board camera, that can recognize the traffic signs 3 arranged on the road.

In all cases, a recommended speed $V_G$ is obtained at the end of the more reliable GLOSA processing algorithm.

Figure 4A:
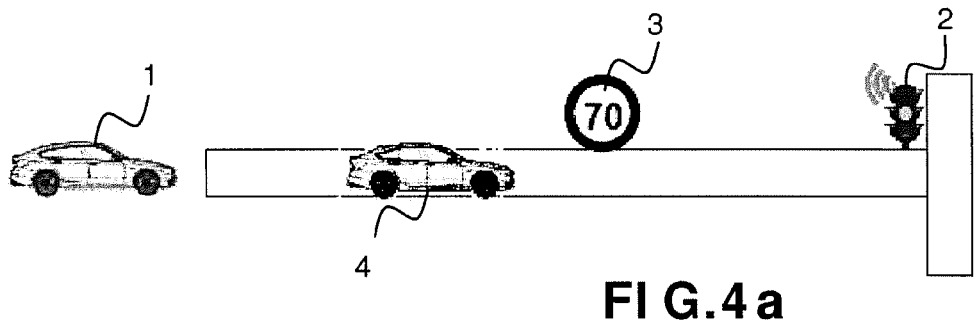
FIGS. 4a and 4b explain an example of implementing the method using the data provided by a speed control system.

FIG. 4a shows another situation in which another vehicle 4 is present on the route separating the motor vehicle 1 and the traffic light 2. In this case, this other vehicle 4 will be detected by the speed control system 12 which will be able to deliver the speed $V_F$ of this other vehicle 4.

Figure 4B:
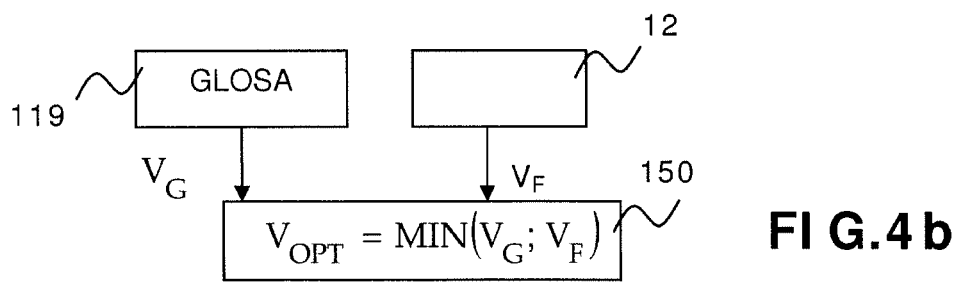

A first possibility according to the invention, and illustrated schematically in FIG. 4b consists in determining, during a step 150, an optimum speed $V_{OPT}$ to be adopted by the vehicle by taking the minimum value between the estimated speed $V_F$ of the other vehicle 4 and the speed $V_G$ recommended by the GLOSA system.

Another possibility would consist in refining the estimation step 112 for the route time $T_{TL}$ by also taking into account the estimated speed $V_F$ of the other vehicle.

The various systems presented above can be combined without departing from the scope of the invention.

The invention claimed is:

1. A method for determining an optimum speed to be adopted by a motor vehicle when said motor vehicle approaches a traffic light, said optimum speed being a function of a recommended speed estimated by a first on-board system, the method comprising:
receiving a message sent by said traffic light including location information;
calculating a total distance of the route separating the motor vehicle and the traffic light, using the location information in the message;
estimating a time required for the motor vehicle to cover said total distance; and
determining the recommended speed as a function of a state held by the traffic light at the end of the estimated time,
wherein at least one of said recommended speed or said optimum speed is also a function of at least one speed limit of a road on which the motor vehicle is traveling, wherein the at least one speed limit is obtained via a sensor on the motor vehicle for monitoring a speed limit sign on the road,
wherein said total distance of the route is broken down into a succession of road sections, and said recommended speed is a function of a plurality of speed limits obtained via the sensor for monitoring a space located in front of the vehicle, each of the plurality of speed limits corresponding to a regulatory maximum speed value allowed on each section of said succession of road sections, and
wherein the time required for the motor vehicle to cover said total distance is estimated by the first on-board system according to the relation:

$$\sum_i \frac{L_i}{\mathrm{MIN}(SL_i; U_0)}$$

wherein $L_i$ corresponds to a length of each section i associated with a regulatory maximum speed value $SL_i$, and $U_0$ is the usual speed of the motor vehicle.

2. The method as claimed in claim 1, wherein a length of each section and the regulatory maximum speed value associated with each section are delivered by a navigation system forming a second on-board system and including a receiver on board the motor vehicle.

3. The method as claimed in claim 2, wherein the second on-board system is a speed control system for detecting the presence and for estimating the speed of another vehicle in front of said motor vehicle, and wherein said at least one speed limit corresponds to the estimated speed of the another vehicle.

4. The method as claimed in claim 3, wherein said optimum speed is determined by taking the minimum value between said estimated speed of the another vehicle and the recommended speed.

5. A system for determining an optimum speed to be adopted by a motor vehicle when said motor vehicle approaches a traffic light, the system comprising:
a first on-board system configured to:
estimate said optimum speed as a function of a recommended speed,
receive a message sent by said traffic light, determine a total distance of a route separating the motor vehicle and the traffic light,
estimate a time required for the motor vehicle to cover said total distance, and
determine a recommended speed as a function of a state held by the traffic light at an end of the estimated time; and a second on-board system configured to:
provide, for each road section included in the total distance of the route separating the motor vehicle and the traffic light, each road section comprising a single speed limit corresponding to a regulatory maximum speed value allowed on the corresponding road section, a length of the road section and the speed limit of the road section to the first on-board system so that the first on-board system determines at least one of said recommended speed or said optimum speed as a function of the at least one speed limit, wherein the time required for the motor vehicle to cover said total distance is estimated according to the relation:

$$\sum_i \frac{L_i}{\text{MIN}(SL_i; U_0)}$$

wherein $L_i$ corresponds to a length of each section i associated with a regulatory maximum speed value $SL_i$, and $U_0$ is the usual speed of the motor vehicle.

6. The system as claimed in claim 5, wherein the second on-board system is a navigation system.

7. The system as claimed in claim 5, wherein the second on-board system is a speed control system configured to:
detect presence and estimate a speed of another vehicle in front of said motor vehicle, and
determine said optimum speed as a function of said speed recommended by the first on-board system and of the estimated speed of the another vehicle.

8. A method for determining an optimum speed to be adopted by a motor vehicle when said motor vehicle approaches a traffic light, said optimum speed being a function of a recommended speed estimated by a first on-board system, the method comprising:
receiving a message sent by said traffic light including location information;
calculating a total distance of the route separating the motor vehicle and the traffic light, using the location information in the message;
estimating a time required for the motor vehicle to cover said total distance; and
determining the recommended speed as a function of a state held by the traffic light at the end of the estimated time,
wherein at least one of said recommended speed or said optimum speed is also a function of at least one speed limit obtained via a second system on board said motor vehicle,
wherein said total distance of the route is broken down into a succession of road sections, and said recommended speed is a function of a plurality of speed limits obtained via the second on-board system, each of the plurality of speed limits corresponding to a regulatory maximum speed value allowed on each section of said succession of road sections, and
wherein the time required for the motor vehicle to cover said total distance is estimated by the first on-board system according to the relation:

$$\sum_i \frac{L_i}{\text{MIN}(SL_i; U_0)}$$

wherein $L_i$ corresponds to a length of each section i associated with a regulatory maximum speed value $SL_i$, and $U_0$ is the usual speed of the motor vehicle.

* * * * *